United States Patent
Neuerburg

(10) Patent No.: US 9,348,597 B2
(45) Date of Patent: May 24, 2016

(54) DEVICE AND METHOD FOR BYPASSING A FIRST PROGRAM CODE PORTION WITH A REPLACEMENT PROGRAM CODE PORTION

(75) Inventor: Julian Neuerburg, Munich (DE)

(73) Assignee: Infineon Technologies AG, Neubiberg (DE)

( * ) Notice: Subject to any disclaimer, the term of this patent is extended or adjusted under 35 U.S.C. 154(b) by 2216 days.

(21) Appl. No.: 12/164,417

(22) Filed: Jun. 30, 2008

(65) Prior Publication Data

US 2009/0327650 A1    Dec. 31, 2009

(51) Int. Cl.
    G06F 12/06    (2006.01)
    G06F 9/32     (2006.01)
    G06F 12/02    (2006.01)

(52) U.S. Cl.
    CPC .......... *G06F 9/322* (2013.01); *G06F 9/328* (2013.01); *G06F 12/0246* (2013.01); *G06F 12/0638* (2013.01)

(58) Field of Classification Search
    None
    See application file for complete search history.

(56) References Cited

U.S. PATENT DOCUMENTS

| | | | |
|---|---|---|---|
| 5,619,678 A | | 4/1997 | Yamamoto et al. |
| 5,726,641 A * | | 3/1998 | Ide ............................... 340/7.39 |
| 5,727,215 A | | 3/1998 | Rynaski et al. |
| 5,731,972 A * | | 3/1998 | Yamamoto et al. ............. 700/79 |
| 5,901,225 A * | | 5/1999 | Ireton et al. ................... 714/6.32 |
| 6,536,034 B1 | | 3/2003 | Nassor |
| 2001/0007124 A1 * | | 7/2001 | Iwamura et al. ............... 711/165 |
| 2002/0091417 A1 * | | 7/2002 | Splett et al. ....................... 607/30 |
| 2005/0030796 A1 * | | 2/2005 | Saado ........................ 365/189.07 |
| 2006/0107104 A1 | | 5/2006 | Alexandre et al. |
| 2007/0083713 A1 * | | 4/2007 | Torrini et al. ................... 711/125 |
| 2008/0112205 A1 * | | 5/2008 | Saado ............................ 711/102 |

FOREIGN PATENT DOCUMENTS

WO    WO-2004/114129 A2    12/2004

OTHER PUBLICATIONS

"Branch table"; Wikipedia, the free encyclopedia; retrieved from "http://en.wikipedia.org/wiki/Branch_table".
"Non-volatile memory", Wikipedia, the free encyclopedia; retrieved from "http://en.wikipedia.org/wiki/Non-volatile_memory".
"EEPROM"; Wikipedia, the free encyclopedia; retrieved from "http://en.wikipedia.org/wiki/EEPROM".
H. Lee, et al. "Efficient ROM Correction Technique for Digital Home Appliances", IEEE Transactions on Consumer Electronics, vol. 50, No. 3, Aug. 2004.

* cited by examiner

*Primary Examiner* — Michael Krofcheck
(74) *Attorney, Agent, or Firm* — Schiff Hardin LLP

(57) ABSTRACT

A device comprises a processor configured to execute a sequence of program instructions, a first storage configured to store a first memory address, a second storage configured to store a second memory address, a program counter configured to determine a memory address of program instructions to be executed, and a program counter manipulator configured to set the program counter to a value corresponding to a content of the second storage in response to the program counter reaching a value corresponding to a content of the first storage.

16 Claims, 5 Drawing Sheets

DEVICE AND METHOD FOR BYPASSING A FIRST PROGRAM CODE PORTION WITH A REPLACEMENT PROGRAM CODE PORTION

BACKGROUND OF THE INVENTION

Embodiments according to the invention relate to devices and methods for bypassing a first program code portion using a replacement program code portion. Some embodiments relate to devices and methods for patching a program code portion stored in a read-only memory (ROM).

Microprocessors are used in a wide range of applications, for example in chip card applications. A microprocessor-based system may comprise a processor or a processor core and a first non-volatile memory device which stores a set of instructions that are to be executed by the processor to provide a desired functionality. The first non-volatile memory device on which the instructions are stored can for example be a read-only memory (ROM), for example a mask programmable read-only memory, which forms part of a same integrated circuit as the processor or which is arranged in the same package as the processor. In such an arrangement the ROM can be created in a same manufacturing process as the processor. However, using a mask programmable ROM has a disadvantage that the set of instructions is frozen and consequently cannot be changed.

Moreover, there are further types of one-time programmable memories, which may be used instead of a mask-programmable read-only memory.

However, it is sometimes desired or necessary to update program code portions in order to correct defects or faults, which are discovered in the program code stored in the ROM after the manufacturing process, or to improve or extend a functionality of the program code.

This is, however, challenging in cases in which it is either impossible, not allowed or undesirable to change a content of the memory in which the program instructions are stored.

SUMMARY OF THE INVENTION

Embodiments according to the invention provide a device comprising a processor configured to execute a sequence of program instructions, a first storage configured to store a first memory address, a second storage configured to store a second memory address, a program counter configured to determine a memory address of program instructions to be executed, and a program counter manipulator configured to set the program counter to a value corresponding to a content of the second storage in response to the program counter reaching a value corresponding to a content of the first storage.

Further, embodiments according to the invention provide a method for bypassing a first program code portion stored at a first memory address of a first memory area using a replacement program code portion stored at a second memory address of a second memory area, the method comprising comparing the first memory address being stored in a first storage with a program counter determining a memory address of program instructions to be executed, setting the program counter to the second memory address in response to the program counter reaching the first memory address, executing the replacement program code portion stored at the second memory address of the second memory area, and, after executing the replacement program code portion, setting the program counter to an address corresponding to a program code portion following the first program code portion to be bypassed.

BRIEF DESCRIPTION OF THE DRAWINGS

Embodiments of the invention will subsequently be described in detail referring to the accompanying drawings, in which.

DETAILED DESCRIPTION OF THE INVENTION

A so-called branch table is often used for transferring program control to another part of a program. The branch table comprises branch instructions to branch addresses, where the other part of the program is stored, or the branch addresses themselves. The branch table may for example be stored in a second non-volatile memory, such as an electrically erasable programmable read-only memory (EEPROM), as a jump table to functions or program codes stored in the first non-volatile memory (ROM). The branch table may store addresses or base addresses of ROM functions.

In case a program code portion of a ROM-function is e.g. erroneous, a method to replace or patch the erroneous program code portion in the first non-volatile memory is to replace the respective function's entry in the branch table by a pointer to a replacement function residing in the second non-volatile memory. In this way, however, typically the whole program function comprising the erroneous program code portion is replaced.

Embodiments of the present invention also allow for a replacement of a single erroneous program instruction or a plurality of erroneous program instructions of a ROM-function instead of replacing the whole ROM-function.

Figure 1:
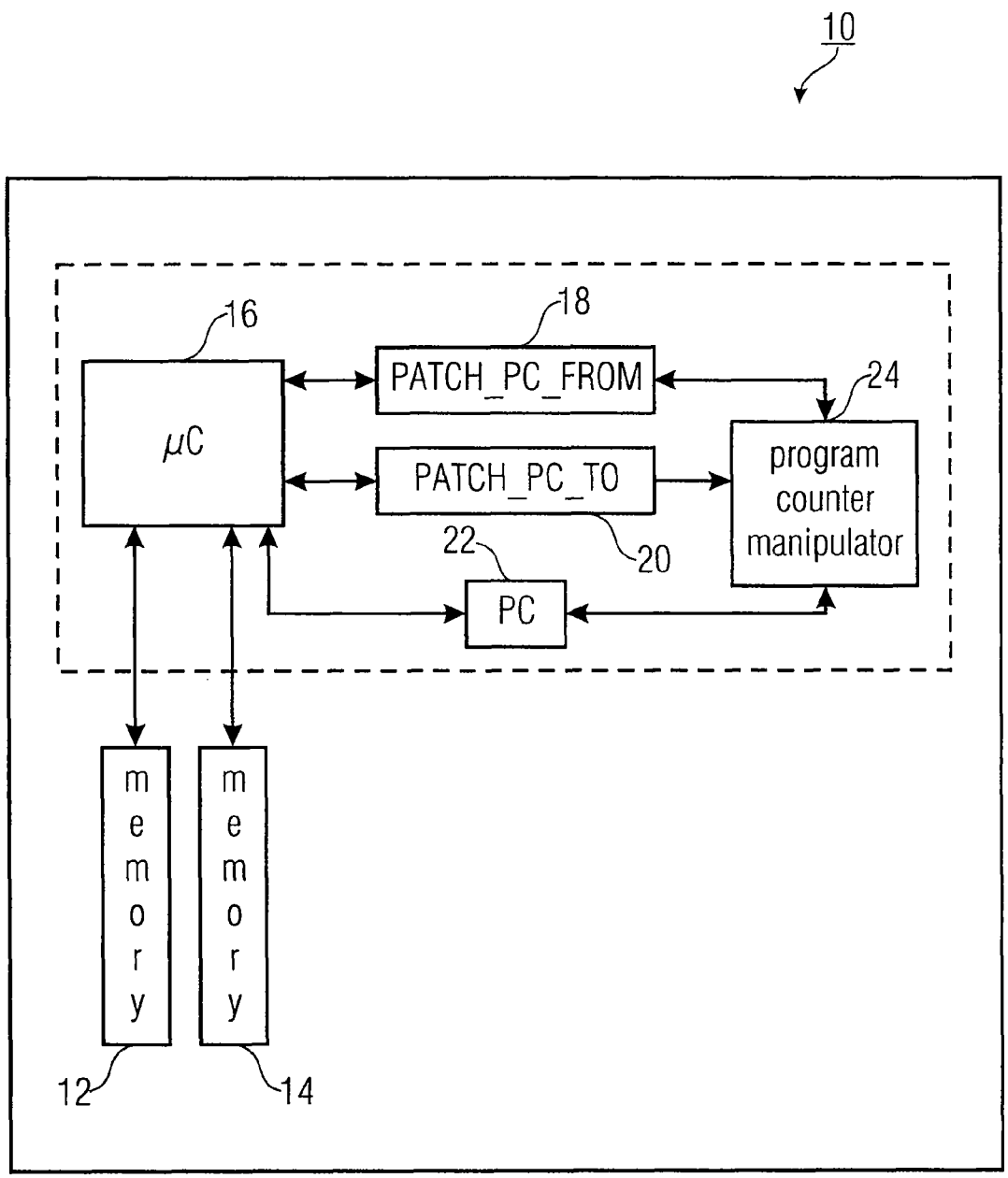
FIG. 1 shows a device for bypassing a first program code portion using a replacement program code portion according to an embodiment of the present invention.

FIG. 1 shows a device 10 for bypassing a first program code portion stored at a first memory address PATCH_PC_FROM of a first memory area 12 using a replacement program code portion stored at a second memory address PATCH_PC_TO of a second memory area 14, according to an embodiment of the present invention.

The device 10 comprises a processor 16 which is configured to execute a sequence of program instructions. Further, the device 10 comprises a first storage 18 configured to store the first memory address PATCH_PC_FROM of the first memory area 12 or a memory address derived from PATCH- _PC_FROM. The first storage 18 may be a memory cell of a volatile or non-volatile memory, a register, a fuse-type storage or any other means for storing information. The device 10 also comprises a second storage 20 configured to store the second memory address PATCH_PC_TO of the second memory area 14 or a memory address derived from PATCH_PC_TO. The processor 16 is coupled to a program counter 22 being configured to determine a memory address of program instructions to be executed by the processor 16. However, in some embodiments the program counter may be an integral component of the processor. Also, the program counter 22 is coupled to a program counter manipulator 24, which is configured to set the program counter 22 to a value corresponding to a content of the second storage 20 in response to the program counter 22 reaching a value corresponding to a content of the first storage 18. In other words, the program counter manipulator 24 may be configured to set the program counter 22 to the second memory address PATCH_PC_TO stored in the second storage 20 in response to the program counter 22 reaching the first memory address PATCH_PC_FROM stored in the first storage 18.

The program counter 22, also called instruction pointer, program counter or "PC", may be a register which indicates where the processor 16 is in its instruction sequence. Depending on the details of the processor 16, the program counter 22 may for example hold an address of an instruction being executed, or an address of a next instruction to be executed. Therefore, the first register 18 may hold the first memory address PATCH_PC_FROM itself or an address derived therefrom, e.g. PATCH_PC_FROM minus one program instruction, depending on the architecture of the program counter 22 or the processor 16. In the following, it shall be assumed that the first register 18 comprises the first memory address PATCH_PC_FROM, although other values are also possible, as described before.

The program counter 22 may be automatically incremented for each instruction cycle so that instructions are normally retrieved sequentially from memory. Certain instructions, such as branches, subroutine calls and returns, interrupt the instruction sequence by placing a new value in the program counter 22. The instruction pointer 22 may be incremented immediately after fetching a program instruction. This means that the target address of a branch instruction is obtained by adding a branch instruction's operand to the address of the next instruction (byte or word, depending on the processor type) after the branch instruction or by loading the branch instruction's operand into the program counter register. The address of the next instruction to be executed may be found in the instruction pointer or program counter 22.

The first memory area 12, which may be a first non-volatile memory area, for example a mask-programmable ROM, may comprise or store a program code or a subroutine or a function, which comprises the first program code portion to be replaced by the second program code portion, i.e. the patch-code.

According to embodiments of the present invention the first storage 18 may be a register and the second storage 20 may also be a register. The first register 18, the second register 20, the program counter 22 and the program counter manipulator 24 may be comprised by the processor 16 which is indicated in FIG. 1 by the dashed box.

Default values of the storages or registers 18 and 20, i.e. values in an unpatched condition of the device 10 may e.g. be zero (0x0000).

The first memory area 12 (which may for example be comprised in a ROM or PROM or EPROM) may comprise hard-wired program functions or program subroutines which can be accessed by a so-called branch table stored in the second memory area 14 (for example in an electronically erasable programmable read-only memory, also designated as EEPROM). A branch table or a jump table may be used for transferring program control (branching) to another part of a program using a table of branch instructions or branch addresses. A branch table may comprise a serial list of unconditional branch instructions that is branched into using an offset created by multiplying a sequential index by the instruction length, the number of bytes in memory occupied by each branch instruction. Alternatively, a program in the first memory area may comprise a jump instruction to a predetermined position of the branch table. Another method of implementing a branch table may be with an array of addresses from which the required addresses are retrieved. This method can result in a smaller code, and avoids an indirect jump. The method used to implement a branch table is usually based on an architecture of the processor 16 on which the code is to be run. A simple example of a branch table as stored in the second memory area 14 is exemplarily shown in FIG. 3A.

The branch table 30 (shown in FIG. 3A) comprises N addresses (N≥1) ADDR_FUNC1, ADDR_FUNC2, . . . , ADDR_FUNCN forming base addresses of program code functions or program code subroutines stored in the first memory area 12. That is, the branch table 30 comprises pointers to functions or sub-routines stored in ROM 12.

Let us assume that a ROM function stored in the first memory 12 at address ADDR_FUNC1 comprises program instructions or a program code portion which should be replaced by another program code portion. This could be necessary to correct defects which are discovered after manufacture of the first memory area, i.e. ROM 12 or to improve the functionality of the program code. A pseudo-code-like example of the program code or function 32 stored at memory address ADDR_FUNC1 in the first memory 12 is given in FIG. 3B.

The ROM function or subroutine 32 stored at memory address ADDR_FUNC1 comprises M program instructions INSTR_1, INSTR_2, . . . , INSTR_M. Now, a first program code portion 34 comprising at least one program instruction INSTR_X stored at the first memory address PATCH_PC_FROM is to be replaced by a second program code portion. This might be due to the fact, that the first program code portion 34 comprises erroneous program instructions or program instructions to be replaced by improved program code.

Since the first memory area 12 typically may be a mask-programmable ROM or some type of one-time programmable memory, the ROM functions stored therein cannot simply be overwritten. Hence, the second memory 14, which may be an EEPROM, may be used to store a second program code portion for replacing the first program code portion 34 stored at the first memory address PATCH_PC_FROM in the first memory 12. Thereby the second program code portion, i.e. the replacement code or the patch code, is stored at the second memory address PATCH_PC_TO in the second memory 14.

Figure 4A:
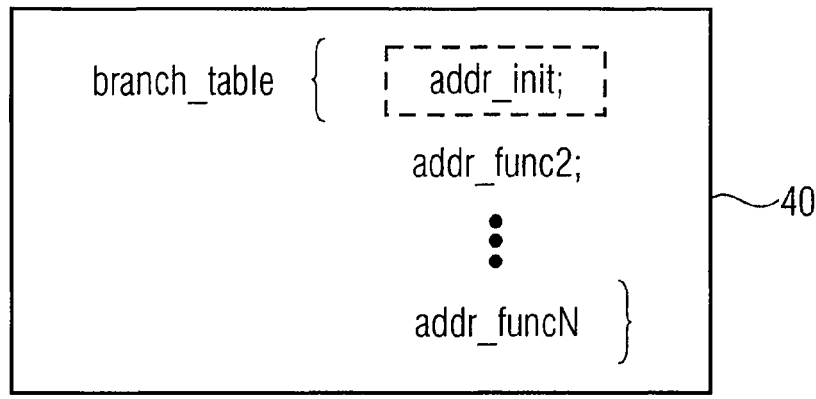
FIG. 4A shows an example of a patched branch table according to an embodiment.

Correction of the first program code portion 34 may be done by replacing the memory address ADDR_FUNC1 in the branch table, wherein ADDR_FUNC1 is pointing to the ROM function 32 comprising the first program code portion 34 to be replaced. Thereby, the memory address ADDR_FUNC1 may be replaced by a memory address ADDR_INIT pointing to an initialization program code or initialization function stored at that memory address ADDR_INIT, for example in the second memory area 14. An accordingly modified branch table 40 is schematically shown in FIG. 4A.

Figure 4B:
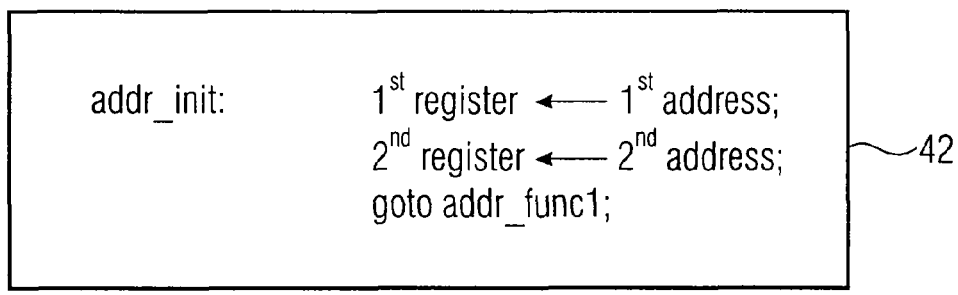
FIG. 4B shows an example of an initialization function for execution prior to an execution of the program code comprising the first program code portion to be replaced according to an embodiment.

It can be seen that the memory address ADDR_INIT of the initialization program code is stored at a position of the branch table 40 associated with the ROM function 32 comprising the first program code portion 34 to be replaced. The initialization program code stored at memory address ADDR_INIT comprises program instructions for initializing the first storage 18 with the first memory address PATCH_PC_FROM of the program code portion 34 to be replaced and for initializing the second storage 20 with the second memory address PATCH_PC_TO of the replacement code or patch code. Further, the initialization function may comprise a branch instruction to set the program counter 22 to the memory address ADDR_FUNC1 of the ROM function 32 comprising the program code portion 34 to be replaced. A pseudo-code-like example for an initialization function 42 stored at the memory address ADDR_INIT is given in FIG. 4B Having modified the branch table according to FIG. 4A, the initialization function 42 stored for example in the second memory area 14 at memory address ADDR_INIT is executed instead of the ROM function 32 stored at memory address ADDR_FUNC1 in the first memory area 12 in a program flow. This initialization function 42 initializes the two storages or registers 18, 20 with the memory addresses PATCH_PC_FROM, PATCH_PC_TO of the program code portion 34 to be replaced and the replacement code portion, respectively. After initialization of the registers 18, 20, the program flow continues with the first program instruction INSTR_1 of the ROM function 32 stored at memory address ADDR_FUNC1.

According to embodiments of the present invention, the program counter manipulator 24 is configured to compare the content of the first storage 18, that is the first memory address PATCH_PC_FROM of the first program code portion 34, to the program counter 22 before or after each change of the program counter 22. According to further embodiments, the program counter manipulator 24 may be only active if a flag indicates that a manipulation of the program counter shall be performed by the program counter manipulator 24. This flag may be stored in an extra register, for example. After or before the execution of a program instruction, the program counter 22 is changed, for example increased. After each increase of the program counter 22, the program counter manipulator 24 may compare a memory address in the program counter 22 with the first memory address PATCH_PC_FROM in the first register 18. In case the program counter 22 reaches the first memory address PATCH_PC_FROM of the program code portion 34 to be replaced, the program counter manipulator 24 sets the program counter 22 to the second memory address PATCH_PC_TO stored in the second register 20. In other words, if the content of the program counter 22 equals (or reaches) the content of the first register 18, the content of the program counter 22 is set equal to the content of the second register 20. That means, that the first program code portion 34, which is to be replaced, is bypassed using the replacement code stored at the second memory address PATCH_PC_TO, for example in the second memory area 14.

Figure 4C:
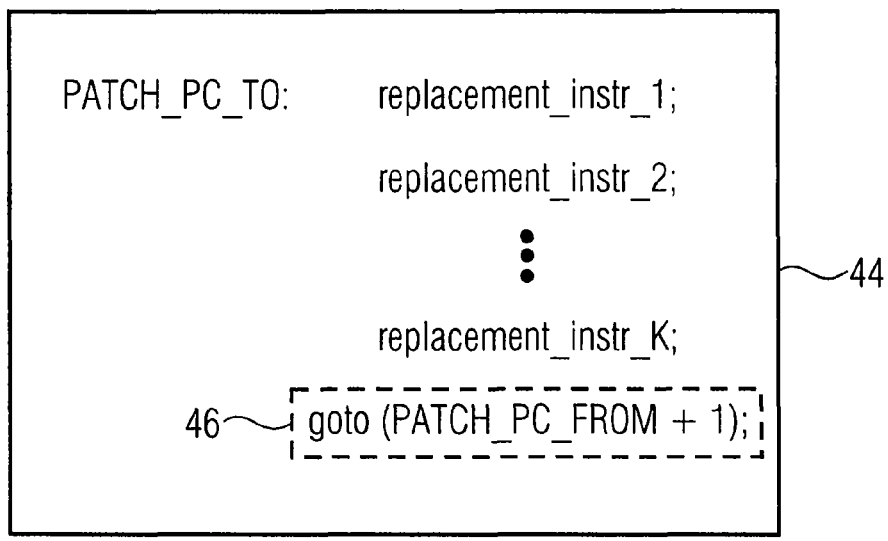
FIG. 4C shows an example of a replacement code portion stored at a second memory address according to an embodiment.

Referring to FIG. 4C, a replacement program code 44 comprises replacement code instructions REPLACEMENT_INSTR_1, REPLACEMENT_INSTR_2, . . . , REPLACEMENT_INSTR_K which are executed during a program flow instead of the program code instruction or program code instructions 34 to be replaced. In order to route a program flow back to "normal", the replacement program code 44 comprises a program instruction 46 for setting the program counter 22 to a memory address corresponding to a program code portion following, in an execution of the ROM function 32, the program code portion 34 to be replaced. That is, in case the program code portion 34 comprises only one program code instruction INSTR_X, the program code instruction 46 for setting the program counter 22 sets the program counter 22 to a memory address corresponding to PATCH_PC_FROM plus one instruction. In case two program code instructions are to be replaced, the last program instruction 46 of the replacement code 44 sets the program counter 22 to a memory address corresponding to PATCH_PC_FROM plus two instructions, etc.

Figure 2:
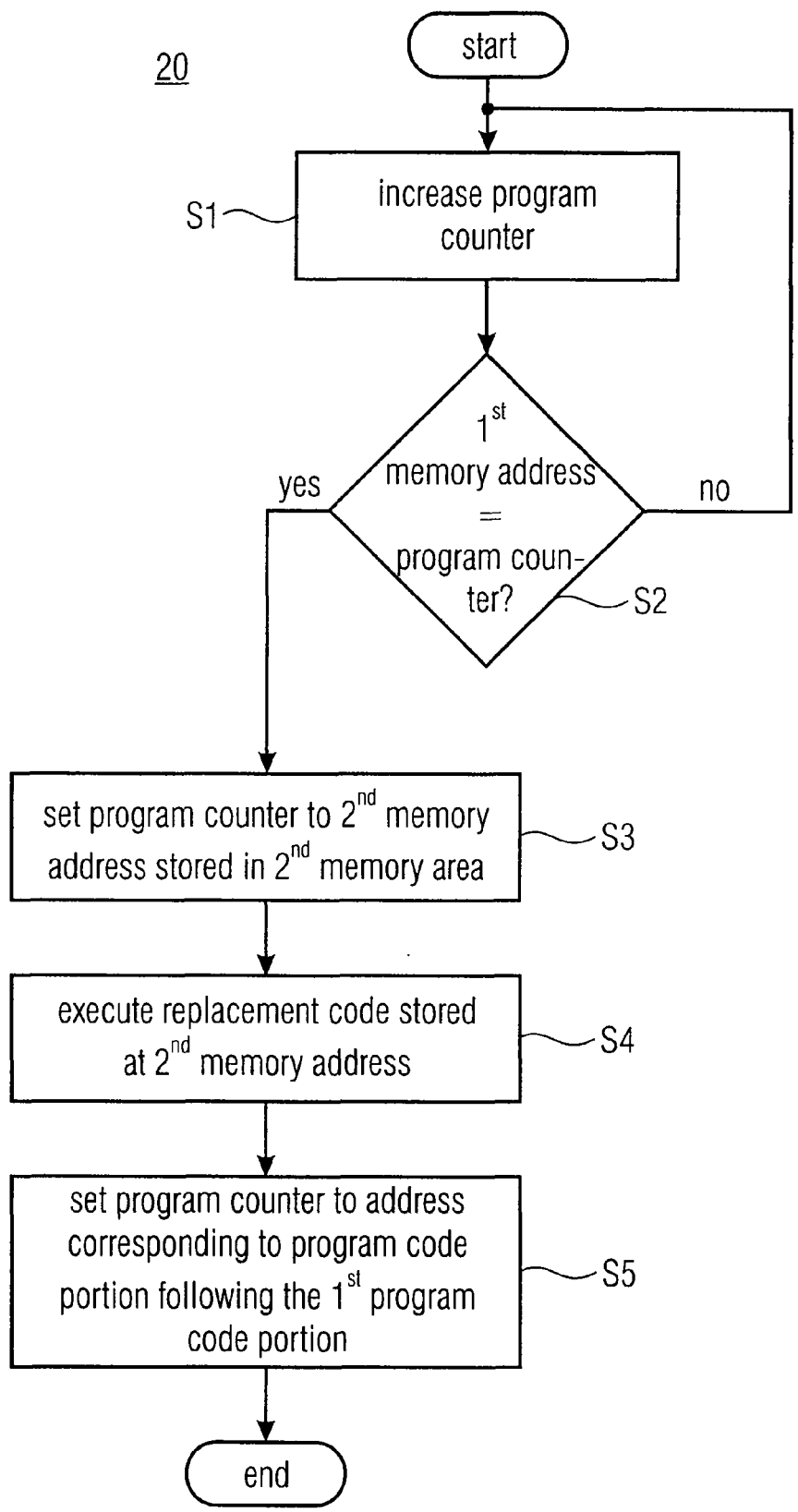
FIG. 2 shows a flow-chart of a method for bypassing a first program code portion using a replacement program code portion according to an embodiment of the present invention.

A method for bypassing the first program code portion 34_at the first memory address PATCH_PC_FROM of the first memory area 12 using the replacement program code portion 44 stored at the second memory address PATCH_PC_TO of the second memory area 14, according to an embodiment of the present invention, is summarized in FIG. 2.

Figure 3A:
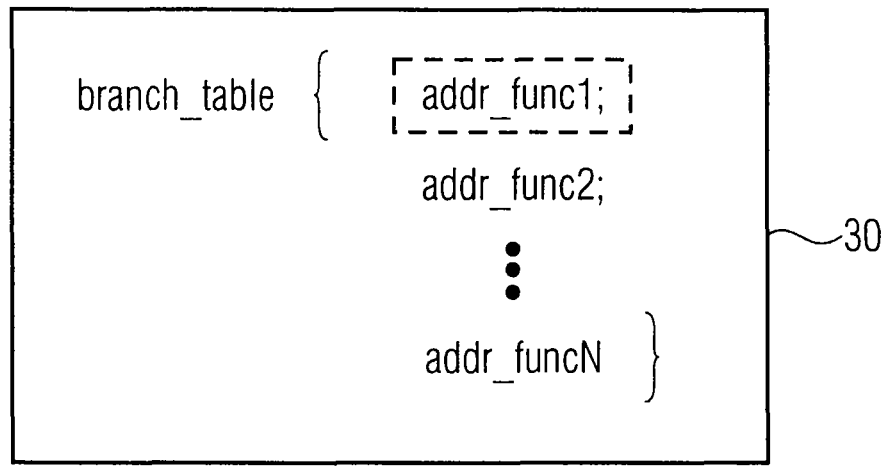
FIG. 3A shows an example of an unpatched branch table according to an embodiment.
Figure 3B:
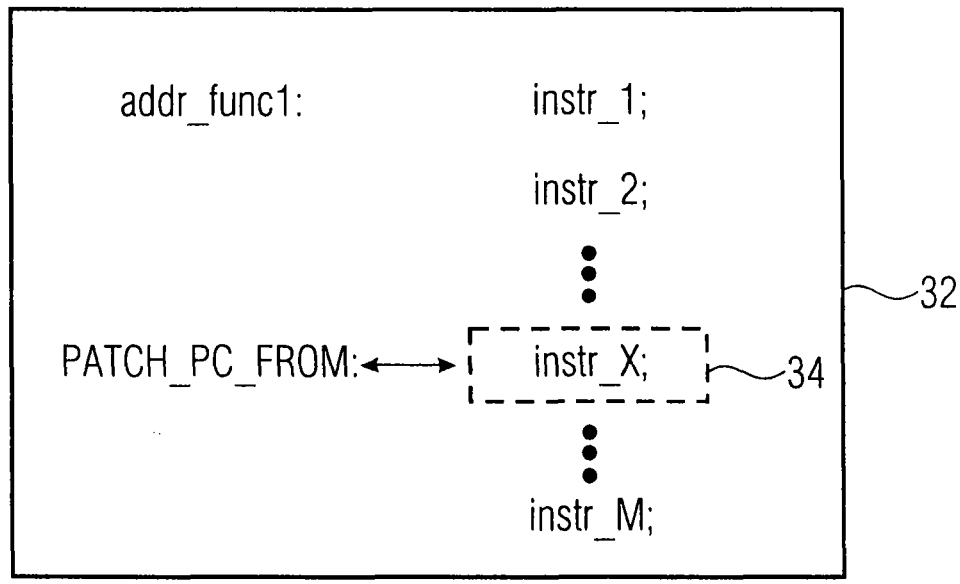
FIG. 3B shows an example of a first program code portion to be replaced.

The method 20 may for example be performed using the device 10 in a patched condition. That means that the branch table stored in the second memory 14 according to FIG. 3A is patched according to FIG. 4A. Further, the initialization function 42 should be stored at the respective memory address ADDR_INIT, for example in the second memory 14. The flow chart depicted in FIG. 2 also assumes that the first and the second registers 18, 20 have been initialized with the first and second memory addresses PATCH_PC_FROM and PATCH_PC_TO, respectively, for example by executing the initialization function 42. Another prerequisite for the method of FIG. 2 is that a memory, for example the second memory 14, comprises the replacement code 44 at the second memory address PATCH_PC_TO. That is, the method 20 depicted in FIG. 2 reflects the situation, wherein the ROM function 32 comprising the program code portion 34 to be replaced is already executed.

After processing program instructions INSTR_1, INSTR_2, . . . , etc., the program counter 22 or its content is increased in a step S1. In a further step S2, the first memory address PATCH_PC_FROM, which may be stored in the first register 18, is compared with the program counter 22. If the program counter 22 and the first memory address PATCH_PC_FROM differ from each other, the code of the ROM function 32 is executed normally. However, in case the program counter 22 and the first memory address PATCH_PC_FROM are equal, this indicates that the memory address PATCH_PC_FROM of the program instruction(s) 34 to be replaced has been reached. Therefore, in step S3, the program counter manipulator 24 sets the program counter 22 to the second memory address PATCH_PC_TO, which may be stored in the second register 20, pointing to the replacement code 44 which may be stored in the second memory area 14. Steps S2 and S3 may be expressed by the following pseudo code:

```
if (PC == PATCH_PC_FROM)
    PC = PATCH_PC_TO;
```

If the content of the program counter 22 equals the content for example or by the following definition: (PATCH_PC_FROM or PATCH_PC_FROM minus one instruction, depending on the architecture) of the first register 18, then set the content of the program counter 22 to the content (PATCH_PC_TO) of the second register 20.

In a next step S4 the replacement code 44, for example the program code depicted in FIG. 4C, is executed by the processor 16.

After executing the replacement program code portion 44, the program counter 22 is set to an address corresponding to a program code portion following the first program code portion 34 to be bypassed in a step S5. After step S5, the first program code portion 34 has been bypassed and the ROM function 32 is executed normally.

After the process of bypassing the program code portion 34 to be replaced using the replacement code 44 has been described in the foregoing, a method 50 for patching the program code portion 34 to be replaced shall be described in the following, referring to FIG. 5.

In a first step S51 the first memory address PATCH_PC_FROM of the program code portion 34 to be replaced is identified. That means, that the memory address PATCH_PC_ FROM of at least one program instruction INSTR_X of a ROM function 32 stored in ROM 12 (or to be stored in the ROM 12) is determined.

In a second step S52 the second memory address PATCH_PC_TO in the second memory area 14, of a location to store the replacement program code 44, is identified. Typically, this replacement program code 44 will be stored at a memory address PATCH_PC_TO in the EEPROM 14 which is still available and not used otherwise.

In a third step S53, the first storage or register 18 of the device 10 is initialized with the first memory address PATCH_ PC_FROM or an instruction for initializing the first storage or register 18 of the device is generated. As described before, this initialization can be done by means of an initialization function 42 stored in the second memory area 14. Alternatively, for example in case the first storage 18 is not a register of processor 16, but a memory area in the EEPROM 14, the initialization of the first storage 18 could also be done or prepared by electrically programming said first storage 18.

In a fourth step S54, the second storage 20 of the device 10 is initialized with the second memory address PATCH_PC_TO, or an instruction for initializing the second storage 20 of the device is generated. Again, this can be done be means of the initialization function 42, as described before. Alternatively, in case the second storage 20 is not a register of processor 16, but a memory area of the second memory 14, said second storage 20 could be initialized by electrically programming.

Figure 5:
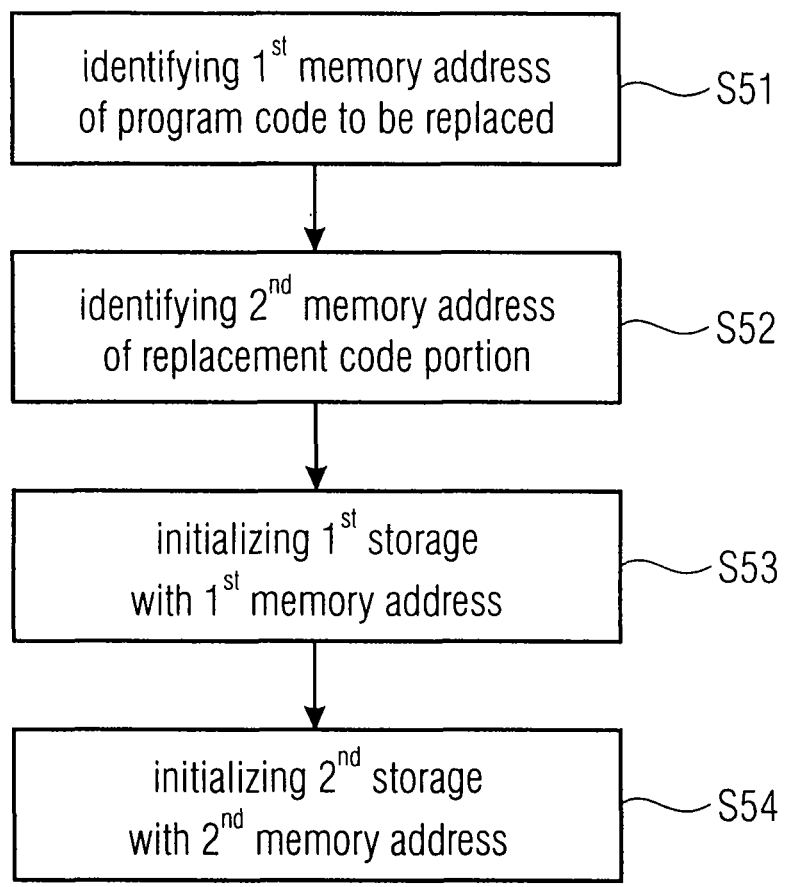
FIG. 5 shows a flow-chart of a method for patching a program code portion of a program code stored in a first memory area of a device according to an embodiment.

When the method 50 according to FIG. 5 has been performed, the program counter manipulator 24 of the device 10 can set program counter 22 to the second memory address PATCH_PC_TO identified by the content of the second storage 20 in response to the program counter 22 reaching the first memory address PATCH_PC_FROM identified by the content of the first storage 18.

In case of the initialization function 42, initializing the first and the second storage 18, 20 comprises creating the initialization program code 42 for initializing the first storage 18 with the first memory address PATCH_PC_FROM and for initializing the second storage 20 with the second memory address PATCH_PC_TO, identifying a memory address ADDR_INIT of a location to store the initialization program code 42, and placing the identified memory address ADDR_INIT for the initialization program code 42 in the branch table 30 comprising references to memory addresses, replacing the memory address ADDR_FUNC1 referencing the program code 32 comprising the first program code portion 34.

Embodiments of the present invention allow patching software or firmware of chip card controllers. That is, embodiments allow a replacement of (erroneous) ROM code by so-called patch code stored in non-volatile memory (EEPROM) which can be installed without the need for generating a new ROM mask. By means of two storages or registers 18, 20 a patch flow can be optimized as follows: A correction of the software/firmware is done by patching a function pointer to the second non-volatile memory in the branch table, pointing to an initialization function 42 for nothing else than initializing the two storages/registers 18, 20. In the first storage/register the ROM address of the erroneous code minus one instruction may be stored, i.e. PATCH_PC_FROM-1. In the second register 20 a memory address PATCH_PC_TO of the non-volatile memory 14 is stored, the memory address PATCH_PC_TO pointing to the replacement code 44 for correcting the erroneous ROM code, the replacement code 44 also comprising a jump instruction for jumping back to the ROM function instructions (or to a ROM program instruction) after the erroneous instructions 34.

Embodiments of the present invention allow an enlargement of a patch area because functioning parts of the ROM 12 do not have to be replaced. Ideally, only erroneous code instructions can be replaced by embodiments of the present invention.

Depending on the circumstances, inventive methods may be implemented in hardware or in software. The implementation may be done on a digital storage medium, particularly a disc, CD or DVD with electronically readable control signals, which may cooperate with a programmable computer system so that the method is executed. In general, the invention first also consists in a computer program product with a program code stored on a machine-readable carrier for performing the inventive method when the computer program product runs on a computer and/or microcontroller. In other words, the invention made us realize the computer program with a program code for performing the method when the computer program runs on a computer and/or microcontroller.

While this invention has been described in terms of several preferred embodiments, there are alterations, permutations and equivalents which fall within the scope of this invention. It should be also noted that there are many alternative ways of implementing the methods and compositions of the present invention. For example, the storages/registers mentioned in this specification could also consist of a plurality of storages/registers. This could be the case if a single register did not suffice for storing a memory address (for example, 16 bit registers, 24 bit memory addresses). It is therefore intended that the following appended claims be interpreted as including all such alterations, permutations and equivalents as fall within the true spirit and scope of the present invention.

The invention claimed is:

1. A device, comprising:
a processor configured to execute a sequence of program instructions;
a first storage configured to store a first memory address;
a second storage configured to store a second memory address;
a program counter configured to determine a memory address of program instructions to be executed; and
a program counter manipulator configured to set the program counter to a value corresponding to a content of the second storage in response to the program counter reaching a value corresponding to a content of the first storage;
wherein the device comprises a first memory area with memory addresses comprising the first memory address;

wherein said first memory area comprises a program code, the program code comprising a program code portion to be replaced;

wherein the device comprises a second memory area with memory addresses comprising the second memory address, wherein said second memory area comprises a replacement program code for replacing the program code portion to be replaced in the sequence of program instructions;

wherein the device comprises a memory area storing an initialization program code comprising program instructions for initializing the first storage with the first memory address and for initializing the second storage with the second memory address and a branch instruction to set the program counter to a memory address at which a first program instruction of the program code comprising the program code portion to be replaced is stored;

wherein the device comprises a branch table of memory addresses, the branch table comprising at least one memory address of at least one program code stored in the first memory area and comprising a memory address of the initialization program code, wherein the memory address of the initialization program code is stored at a position of the branch table of memory addresses associated with the program code comprising the program code portion to be replaced.

2. The device according to claim 1, wherein the program code portion to be replaced is stored at the first memory address.

3. The device according to claim 1, wherein the first memory area is non-programmable read-only memory (ROM).

4. The device according to claim 1, wherein the replacement program code comprises a program instruction for setting the program counter to an address corresponding to a program code portion following, in an execution of the program code, the program code portion to be replaced.

5. The device according to claim 1, wherein the second memory area is a programmable read-only memory.

6. The device according to claim 1, wherein the program counter manipulator is configured to compare the content of the first storage to the program counter before or after each change of the program counter.

7. The device according to claim 6, wherein the program counter manipulator is configured to manipulate the program counter only if a flag indicates that a manipulation shall be performed by the program counter manipulator.

8. A device, comprising:
a processor configured to execute a sequence of program instructions;
a program counter configured to determine a memory address of program instructions to be executed;
a first storage configured to identify a first memory address;
a second storage configured to identify a second memory address;
a first memory area storing a program code portion to be replaced by a replacement program code, wherein the program code portion to be replaced is stored at the first memory address;
a second memory area storing the replacement program code at the second memory address; and
a program counter manipulator configured to set the program counter to a value corresponding to the content of the second storage in response to the program counter reaching a value corresponding to the content of the first storage, in order to bypass the program code portion to be replaced with the replacement program code;
a memory area configured to store an initialization program code, the initialization program code comprising program instructions for initializing the first storage with the first memory address, for initializing the second storage with the second memory address, and a branch instruction for activating a non-defective program code portion, wherein the branch instruction is configured to set the program counter to a memory address at which a first program instruction of a program code comprising the program code portion to be replaced is stored; and
a branch table, wherein the branch table comprises:
at least one reference to a memory address of at least one program code stored in the first memory area; and
a reference to a memory address of the initialization program code, wherein the memory address of the initialization program code is stored at a position of the branch table associated with a program code comprising the program code portion to be replaced.

9. The device according to claim 8, wherein the program counter manipulator is configured to compare the content of the first storage to the program counter to determine whether to set the program counter to the value corresponding to the content of the second storage.

10. The device according to claim 9, wherein the second memory area is an electrically erasable programmable read-only memory (EEPROM).

11. The device according to claim 8, wherein the first memory area is a mask-programmed read-only memory (ROM).

12. The device according to claim 8, wherein the replacement program code comprises a program instruction for setting the program counter to an address corresponding to a program code portion following, in an execution of the program code, the program code portion to be replaced.

13. A method for bypassing a program code portion to be replaced at a first memory address of a first memory area using a replacement program code portion stored at a second memory address of a second memory area, the method comprising:
initializing a first storage with the first memory address and initializing a second storage with the second memory address by means of an initialization program code,
wherein the initialization program code comprises program instructions for initializing the first storage with the first memory address and for initializing the second storage with the second memory address and a branch instruction to set the program counter to a memory address at which a first program instruction of a program code comprising the program code portion to be replaced is stored, and
wherein a branch table comprises at least one memory address of at least one program code stored in the first memory area and a memory address of the initialization program code, wherein the memory address of the initialization program code is stored at a position of the branch table of memory addresses associated with the program code comprising the program code portion to be replaced;
comparing the first memory address being stored in a first storage with a program counter determining a memory address of program instructions to be executed;
setting the program counter to the second memory address in response to the program counter reaching the first memory address;

executing the replacement program code portion stored at the second memory address of the second memory area; and after executing the replacement program code portion, setting the program counter to an address corresponding to a program code portion following the program code portion to be replaced.

14. The method according to claim 13, wherein the comparing comprises comparing the program counter with a content of the first storage.

15. A method for patching a program code portion of a program code stored in a first memory area of a device, the method comprising:
- identifying a first memory address of the program code portion which is to be replaced by a replacement program code portion;
- identifying a second memory address in a second memory area of where to store the replacement program code portion;
- initializing a first storage of the device to identify the first memory address; and
- initializing a second storage of the device to identify the second memory address,
- wherein a program counter manipulator of the device can set a program counter to the second memory address identified by a content of the second storage in response to the program counter reaching the first memory address identified by the content of a first storage,
- wherein the initializing the first storage and the second storage comprises:
- creating an initialization program code for initializing the first storage with the first memory address and for initializing the second storage with a second memory address,
- wherein the initialization program code comprises a branch instruction to set the program counter to a memory address at which a first program instruction of a program code comprising the program code portion to be replaced is stored;
- identifying a memory address of a location to store the initialization program code; and
- placing the identified memory address for the initialization program code in a branch table comprising references to memory addresses, replacing a memory address referencing the program code comprising the first program code portion.

16. A non-transitory computer readable medium storing a program code, which cooperates with a programmable computer system such that a method for patching a program code portion of a program code stored in a first memory area of a device, is performed, the method comprising:
- identifying a first memory address of the program code portion which is to be replaced by a replacement program code portion;
- identifying a second memory address in a second memory area of a location to store the replacement program code portion;
- initializing a first storage of the device to identify the first memory address; and
- initializing a second storage of the device to identify the second memory address,
- wherein a program counter manipulator of the device can set a program counter to the second memory address identified by a content of the second storage in response to the program counter reaching the first memory address identified by the content of a first storage;
- wherein the initializing the first storage and the second storage comprises:
- creating an initialization program code for initializing the first storage with the first memory address and for initializing the second storage with a second memory address,
- wherein the initialization program code comprises a branch instruction to set the program counter to a memory address at which a first program instruction of a program code comprising the program code portion to be replaced is stored;
- identifying a memory address of a location to store the initialization program code; and
- placing the identified memory address for the initialization program code in a branch table comprising references to memory addresses, replacing a memory address referencing the program code comprising the first program code portion.

* * * * *